J. B. REYNOLDS.
GEAR SHIFTER.
APPLICATION FILED APR. 17, 1917.
1,279,442.
Patented Sept. 17, 1918.
2 SHEETS—SHEET 1.
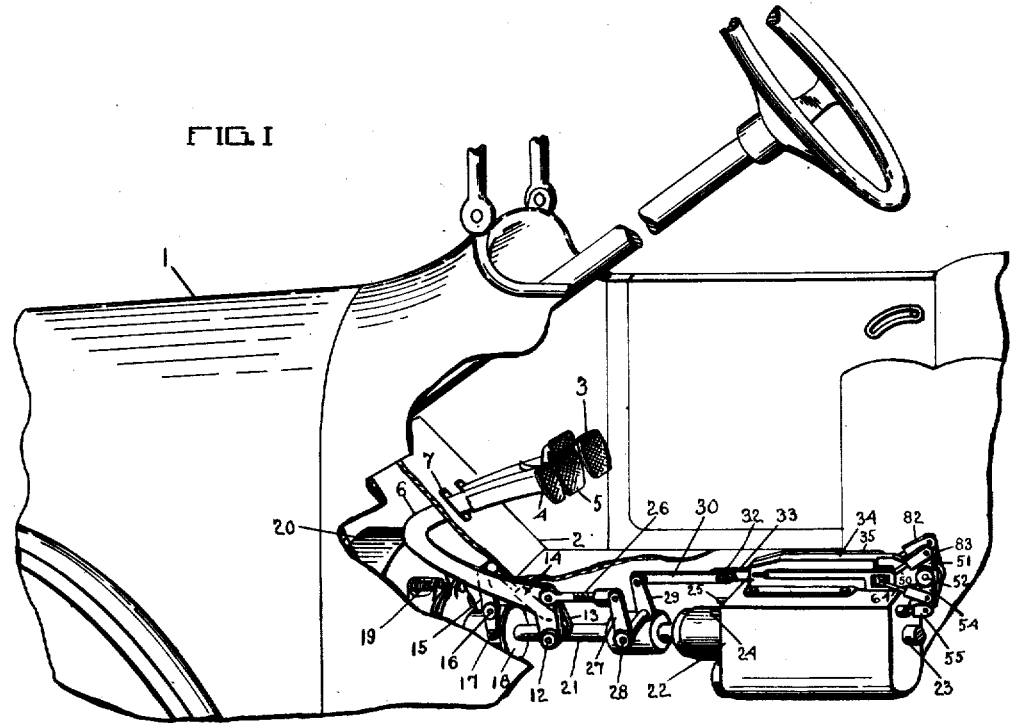
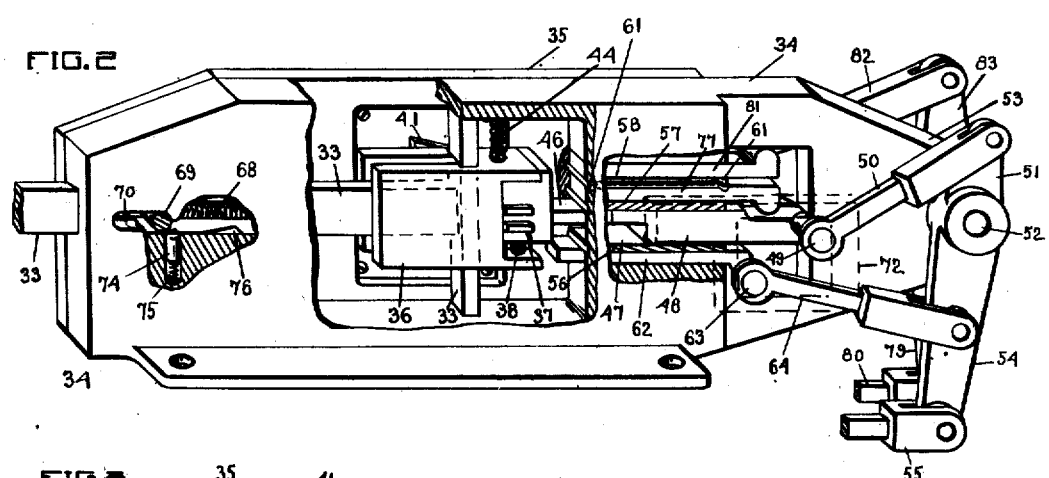
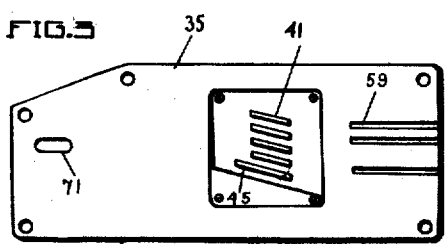
John B Reynolds, Inventor
By Geo E Kirk
Attorney

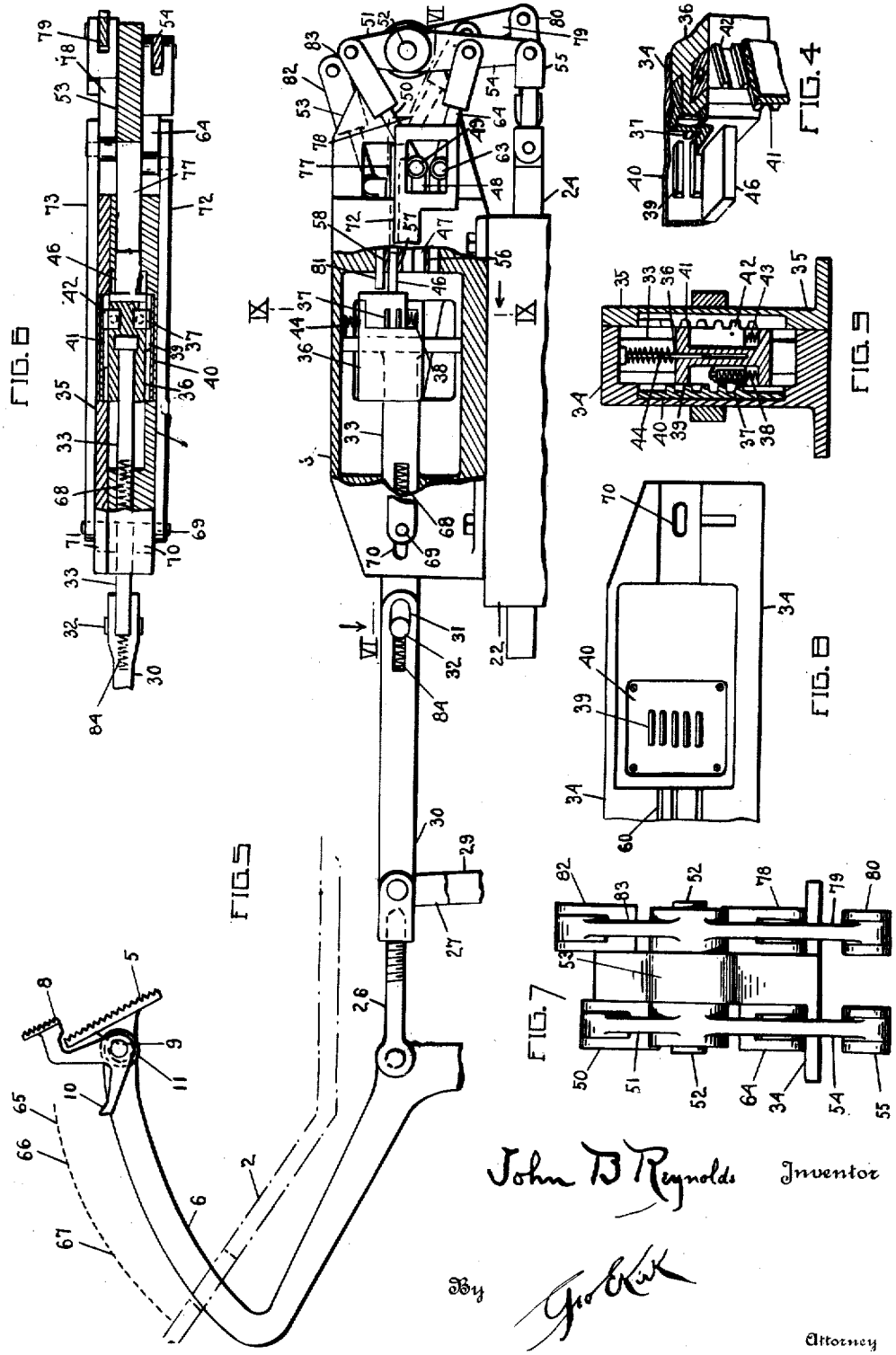

UNITED STATES PATENT OFFICE.

JOHN B. REYNOLDS, OF TOLEDO, OHIO.

GEAR-SHIFTER.

1,279,442.

Specification of Letters Patent. Patented Sept. 17, 1918.

Application filed April 7, 1917. Serial No. 160,353.

*To all whom it may concern:*

Be it known that I, JOHN B. REYNOLDS, a citizen of the United States of America, residing at Toledo, Lucas county, Ohio, have invented new and useful Gear-Shifters, of which the following is a specification.

This invention relates to features of variable speed gearing control.

This invention has utility when incorporated in motor vehicles, especially for pedal actuation.

An embodiment of the invention herein disclosed may be considered as progressive in its action for clutch pedal interconnection and operation, which clutch pedal operation control has as a factor the travel extent of the clutch pedal giving possibilities for neutral and reverse from any position.

Referring to the drawings:

Fig. 1 is a fragmentary perspective view of a motor vehicle showing an embodiment of the invention incorporated therein;

Fig. 2 is a perspective view on an enlarged scale of the control unit;

Fig. 3 is a side elevation of a plate of the control unit showing the inclined tooth insert ratchet plate;

Fig. 4 is a fragmentary perspective view of the inclined tooth ratchet coacting with the tooth plate of Fig. 3;

Fig. 5 is a side elevation of the pedal or manual actuator connected to the control unit;

Fig. 6 is a section on the line VI—VI, Fig. 5;

Fig. 7 is an elevation of the control unit from the right of Fig. 5;

Fig. 8 is a side elevation of the plate opposite from the plate of Fig. 3, showing the straight tooth insert for coacting with the straight ratchet; and Fig. 9 is a section on the line IX—IX, Fig. 5.

The motor vehicle 1 may be provided with the floor 2, through openings in which may project the service brake pedal 3 and the emergency brake pedal 4. Between these pedals 3 and 4 is disposed the clutch pedal 6 having the tread 5 rigid with the pedal lever 6 projecting through the opening 7 in the floor 2 of the car.

Pivotally mounted upon this clutch lever 6 is the auxiliary tread member 8 having the pivot bearing 9 and the projecting arm 10 normally held by coil spring 11 in the position shown in Figs. 1 and 5 to bring the tread 8 above the tread 5. This will cause the arm 10 to strike the floor 2 outside the opening 7 thereby limiting the thrust forward position of the travel of the clutch lever 6.

This clutch lever 6 is mounted on the fulcrum 12 carrying rigid therewith the arm 13 connected by link 14 to the lever 15 having the fixed fulcrum 16 to the fork 17 operable to pull the clutch member 18 against the resistance of springs 19, thereby disconnecting the internal combustion motor driven flywheel 20 from driving the shaft 21 extending into the variable speed transmission housing 22 for giving a plurality of speeds to the propeller shaft 23 as affected by the operation of the reciprocable shift bars 24, 25, for producing respectively low and reverse, and intermediate and high driving speed connections.

Adjustably connected to the clutch lever 6 (Figs. 1, 5) is the link 26 extending to the arm 27 on the rock shaft 28 having the arm 29 provided with the link 30 extending rearward therefrom having the slot 31. This slot 31 has loose connection with the pin 32 on the reciprocable T-member 33 guided in the control unit housing 34 having the closure plate 35 (Figs. 2, 5, 6).

Mounted on this T-head 33 is the control member 36 reciprocable with the T-head and transversely movable thereacross as actuated by the toothed element 37 (Figs. 8, 9) disposed in said member or frame 36 and normally upwardly pressed by the spring 38 also coacting in the frame 36 for holding the element 37 in snug engagement with the straight or horizontal teeth 39 carried by the insert plate 40 in the control unit housing 34. The teeth in the element 37 extend in the direction of reciprocation or travel of the head or control device 33.

Staggered to be disposed a little forward of these horizontal teeth 39 and in the opposite member 35 of the control unit housing are the inclined teeth 41 (Figs. 3, 4) coacting with the inclined teeth 42 disposed in the frame 36 and normally upwardly actuated by a spring 43 also coacting in the frame 36. In the travel of the member 36 forward, the element 37 may leave the teeth 36 while the teeth 42 still coact with the inclined teeth 41. This means that in this forward movement, the spring 38 at its release at once thrusts element 37 to its upper limit in the member 36 so that in the recover or rearward travel of the member 36, this element 37 due to the lift of the inclined teeth on element 41 will travel in the teeth one tooth higher on the member 40. Should this pull forward of the member 36 be sufficient to clear the teeth 42 from the teeth 41, the spring 44 coacting from the control device or member 32, may act upon the member 36 to force the member 36 downward to have its teeth 42 strike the longer inclined tooth 45 (Fig. 3) carried by the frame member 35 below the inclined teeth 41. This recover travel will cause the ratchet 37 in its guiding travel in the teeth 39 to throw the rearwardly protruding tongue 46 rigid with the element 37 into the recess 47 resulting in no shifting of the bars, 24, 25, but the leaving of these bars in neutral position.

This recess 47 is in the bar 48 reciprocable in the frame 34, 35, and carrying the trunnion 49 laterally protruding from the frame or housing and connected by the link 50 to arms 51 loosely mounted on pin 52 carried by the rearwardly protruding bracket 53 from the control unit housing 34. This arm 51 is the upper arm of a lever having the lower arm 54 connected by link 55 to the shift bar 24.

This bar 48 is carried over plate 56 and under plate 57 in the unit housing 34 for free reciprocation. These plates 56, 57, have also associated and spaced from plate 57, a similar plate 58 mounted in guide ways 59 in the unit housing closure plate 35 and guide ways 60 in the unit housing 34. To prevent sliding of these plates 56, 57, 58 in these ways 59 and 60, the plates are provided with terminal projections or ears 61 on each side at each end thereof.

In the region below plate 56 in the frame 34, 35 is the bar 62 having the laterally protruding trunnion 63 connected by link 64 with the arm 54. Accordingly, in the recover travel of the member 36 having its tongue 46 thrust this member 62 rearwardly, the lever 51, 54, is rocked to draw the shift bar 54 rearwardly and actuate the transmission for reverse. This position for reverse throw is obtained by rocking the auxiliary tread 8 adjacent the tread 5 so that the arm clears the opening 7 and the tread 5 has its throw full distance forward or so as to bring the arm 10 through the floor 2. This withdraws the members 36 to such a position that the inclined ratchet 42 is pulled clear of the inclined tooth 45 to ride therebelow in the recover movement of the lever 6 as actuated by the spring 19.

In the thrusting forward of the tread 5 (Fig. 5) to bring the arm 10 say from the point 65 to the point 66, the clutch 18 may be released and the link 30 meantime brought up to engage the pin 32. Continued movement in this same single direction or thrust of the pin 9 forward to bring the arm 10 to position 67 pulls the control member 36 to a position that the element 37 is clear of its teeth 39 and due to the action of teeth 42 coacting with the inclined teeth of the member 35, there is release of the member 36 so that the recover travel from the point 67 will result in bringing the tongue 46 in its recover travel into the recess 47.

When the movement of the lever 6 picks up the T-member 33, this T-member 33 through its spring 68 disposed longitudinally in the member 33, engages the pin 69 transversely thereof through the frame or housing 34. This pin 69 reciprocable in the slots 70, 71, of the housing or frame 34, 35, pulls the yoke members 72, 73, (Figs. 5, 6) one along each side of the frame 34, 35, to embrace the protruding trunnions. Accordingly, in the forward thrust from position 66 to position 67, the yoke 72 engages the rearwardly thrust trunnion 63, pulling it forward thereby disconnecting the transmission from reverse and bringing it to neutral so that in the recover travel of the tongue 46 it works idly in the recess 47.

The next thrust forward of the tread 5 (Fig. 5) from position 66 to position 67 will cause the like stepping up or progressive lift of the member 36 through the ratchets. The position 67 may be easily felt by the operator moving the tread 5 for the pin 74 (Fig. 2) actuated by the spring 75 rides in the way 76 of the T-member 33 offering resistance as the ratchet 37 leaves the teeth 39. Accordingly, recover will throw the tongue 46 against the bar 48 and oppositely shift the shift bar 24 into first speed forward.

The next thrust forward of the tread 5 if past the resistance of the way 76 would result in the recover being at neutral. However with the thrust forward being limited by the way 76, the recover will cause the tongue 46 to engage the bar 77 having a trunnion thereon protruding laterally of the frame 34 and connected by link 78 to the arm 79 of a second lever carried by the pin 52 on the opposite side of the bracket 53. This lever 79 is connected by link 80 to the shift bar 25 and this travel results in the transmission connection for intermediate or second speed forward.

A thrusting forward again of the tread 5 to the position 67 will result in the lever 79 being rocked to neutral by the yoke 73 and with the member 36 stepped up one more step, the recover travel of the tongue 46 pushes the bar 81 rearwardly and which bar has its trunnion protruding laterally of the frame 34 to engage link 82 connected by the arm 83 rigid with the lever 79 to thrust the link 80 and its connected shift bar 25 forward thereby shifting the gearing in the transmission for third speed forward or high.

It is accordingly seen this device is of simple structure and one which may be readily and simply operated from a single control source in either direction from neutral or from any position to neutral, definitely determined by the feel from the way 76 if just shifting is to occur, by full throw forward if to go to neutral and by the tilting of the auxiliary tread 8 if to go to reverse. There is precluded any second shifting for the yokes 72, 73 pull to neutral any shifted connection before the recover travel of the pedal effects the gear shifting and this gear shifting is timed to occur by the spring 84 before the clutch is set. The pull of these yokes 72, 73, to neutral is effected at once the member 33 is caused to travel but the continued or entire distance travel may not place a strain upon the yokes 72, 73 for the pin 69 has its travel limited by the guides 70, 71, notwithstanding the member 33 may continue its travel as permitted by the spring 68.

What is claimed and it is desired to secure by Letters Patent is:

1. Multiple speed mechanism and a controller therefor including a speed change actuator movable in one direction to positions for selecting, and in reverse direction for effecting different speed connections of the mechanism.

2. Multiple speed shiftable gear mechanism, and a controller therefor including a pedal movable to different positions for shifting different gears.

3. Multiple speed mechanism, and a controller for the mechanism including progressive change speed means, and a speed change actuator movable in one direction to positions for selecting and oppositely therefrom for effecting speed connections in the mechanism through the means.

4. Multiple speed shiftable gear mechanism, and a progressive controller therefor including a pedal movable to different forward positions for shifting different gears.

5. Multiple speed mechanism, and a controller therefor including a speed change actuator having in a single direction of its movement positions for selecting and effecting connection in the mechanism for different speeds.

6. Multiple speed mechanism having reverse, forward and neutral speeds, and a controller for the mechanism including progressive change speed means and a speed change actuator having in a single direction of its movement positions for selecting connection in the mechanism through the means of reverse, forward and neutral speeds.

7. Multiple speed mechanism, and a controller for the mechanism including progressive change speed means, and a speed change actuator movable in one travel direction to position at which the actuator is provided with coacting devices for selecting connection in the mechanism through the means of forward speeds, and in the same direction of its movement another position at which the actuator is provided with coacting devices for selecting neutral speed connection.

8. Multiple speed mechanism, and a controller for the mechanism including progressive change speed means and a speed change actuator having in a single direction of its movement different positions for selecting and effecting connection in the mechanism through the means of reverse, forward and neutral speeds, there being actuator travel impeding means defining said positions.

9. Multiple speed mechanism, and a progressive controller therefor including a pedal movable in one direction to a station for effecting the next progressive speed change in the mechanism, there being yieldable means interfering with the pedal travel for determining such progressive station, said pedal having a relatively movable member normally interfering at a second station beyond the progressive station at which the pedal may effect neutral speed change, the shifting of said member permitting still further movement of the pedal in the common direction to a third station for effecting the reverse speed change of the mechanism.

10. Multiple speed mechanism having reverse, forward and neutral speeds, and a controller therefor including a frame, elements extending from the frame to the mechanism respectively movable to determine a selected speed connection of the mechanism, a device in the frame shiftable in one direction to return to different positions to effect actuation of specific elements thereby, and a control member coacting with the device to determine device return positions.

11. Multiple speed shiftable gear mechanism, and a controller therefor including a frame and a reciprocable control member extending into the frame and movable in one direction relatively thereto to positions for selecting forward neutral and reverse driving relations of the mechanism and by recover movement shifting to such selected relations.

12. Multiple speed mechanism, and a controller therefor including a housing, a reciprocable device in the housing having a plurality of positions for reciprocation, and a control member extending into the housing and effective in its reciprocation travel to select the reciprocation position of the device and actuate the device for effecting forward, neutral and reverse driving relations of the mechanism.

13. Multiple speed control mechanism having a control device, a shiftable device, and a frame therefor including guiding mechanism interacting between the frame and one device for changing the relative position of the devices.

14. Multiple speed control mechanism having a control device, a shiftable device, and a frame therefor including guiding mechanism interacting between the frame and one device for changing the position of the shiftable device as to the frame and control device.

15. Multiple speed control mechanism having a control device, a shiftable device, and a frame therefor including toothed guide mechanism interacting for shifting one device in the frame relatively to the other device.

16. Multiple speed control mechanism having a control device, a shiftable device, one device embodying relatively movable elements provided with teeth, and a frame for the devices including toothed guide means interacting with the toothed elements for changing the relative position of the devices.

17. Multiple speed control mechanism having a control device, a shiftable device embodying relatively movable elements provided with teeth, and a frame for the devices including toothed guide means interacting with the toothed elements for shifting the shiftable device as to the control device.

18. Multiple speed control mechanism having a reciprocable control device, a transversely shiftable device, and a frame for the devices including guide means interacting to cause the control device to actuate the shiftable device transversely of control device travel.

19. Multiple speed control mechanism embodying a reciprocable control device, a relatively transversely shiftable device having teeth, and a frame for the devices, said frame having teeth coacting with the teeth of the shiftable device for effecting transverse shifting of the shiftable device by reciprocation of the control device.

20. Multiple speed control mechanism embodying a reciprocable control device, a relatively transversely shiftable device having teeth extending in the direction of reciprocation of the control device and teeth inclined to the direction of reciprocation of the control device, and a frame for the devices, said frame having teeth coacting with the teeth of the shiftable device for effecting transverse shifting of the shiftable device in the frame.

In witness whereof I affix my signature.

JOHN B. REYNOLDS.

Copies of this patent may be obtained for five cents each, by addressing the "Commissioner of Patents, Washington, D. C."

It is hereby certified that in Letters Patent No. 1,279,442, granted September 17, 1918, upon the application of John B. Reynolds, of Toledo, Ohio, for an improvement in "Gear-Shifters," an error appears in the printed specification requiring correction as follows: Page 3, line 68, claim 7, strike out the words "movable in one travel direction to" and insert the words *having in one direction of its movement a;* and that the said Letters Patent should be read with this correction therein that the same may conform to the record of the case in the Patent Office.

Signed and sealed this 15th day of October, A. D., 1918.

[SEAL.]

R. F. WHITEHEAD,
*Acting Commissioner of Patents.*

Cl. 74—58.